Dec. 2, 1941.   F. J. WESTROPE   2,264,602
FOLDABLE VEHICLE TOP
Filed July 3, 1940   2 Sheets-Sheet 2
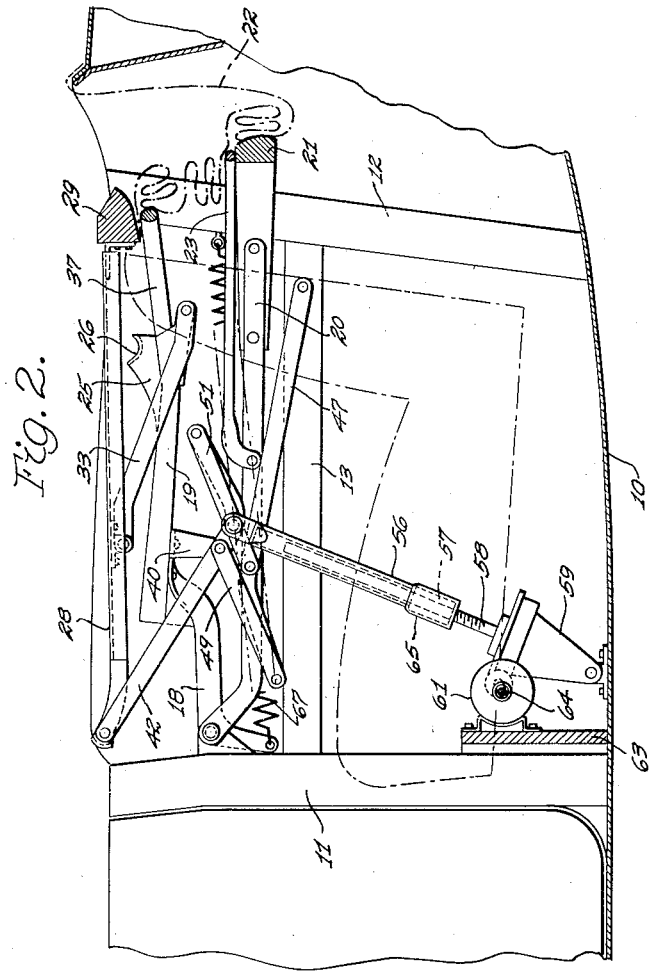
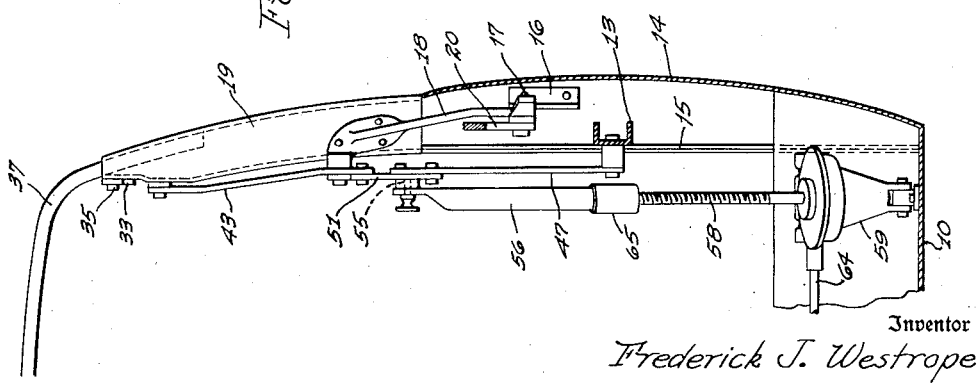
Inventor
Frederick J. Westrope
By
Attorneys Patented Dec. 2, 1941

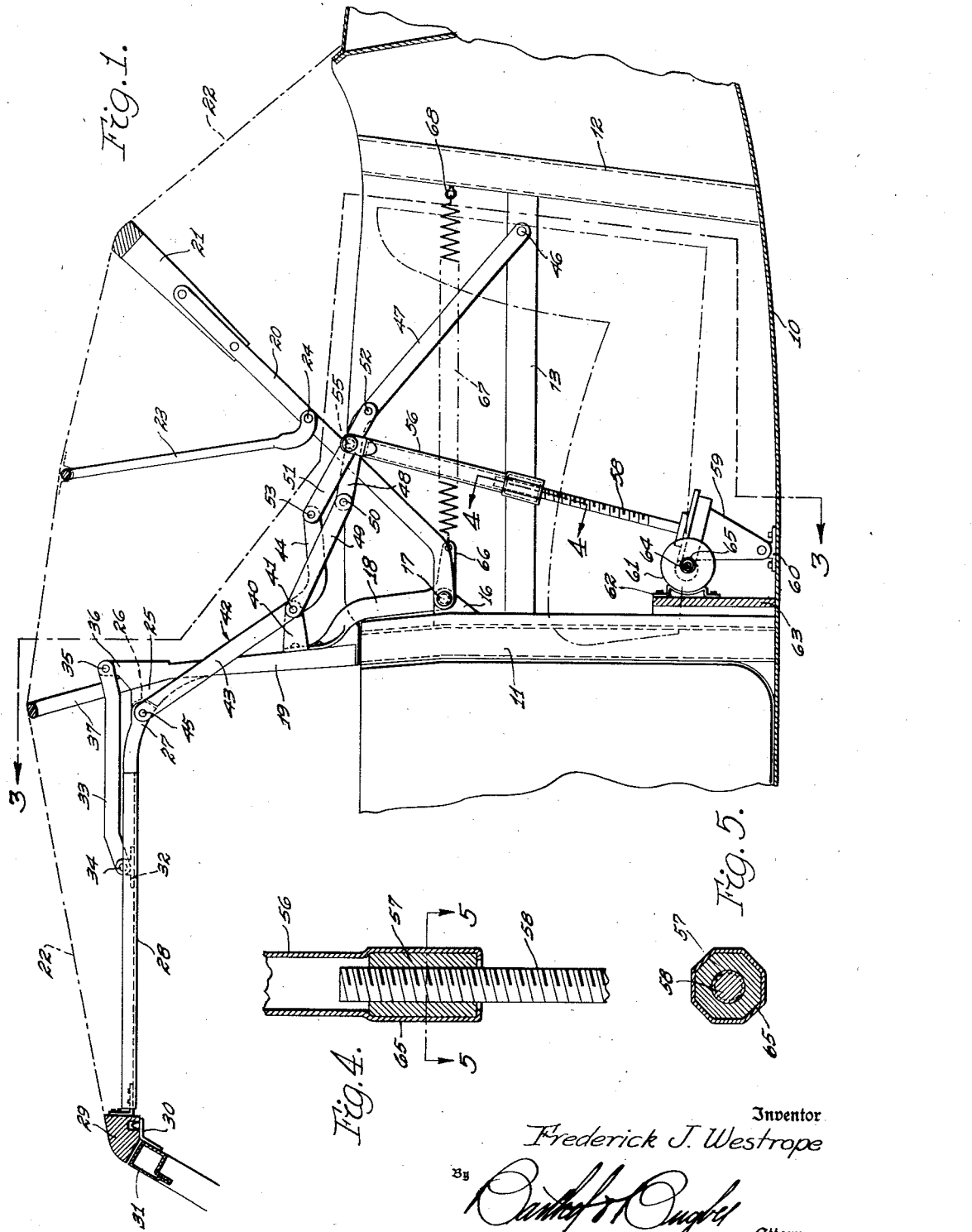

2,264,602

UNITED STATES PATENT OFFICE 2,264,602

FOLDABLE VEHICLE TOP

Frederick J. Westrope, Pleasant Ridge, Mich., assignor, by mesne assignments, to Reconstruction Finance Corporation, Detroit, Mich., a corporation of the United States Application July 3, 1940, Serial No. 343,843

7 Claims. (Cl. 296—116)

This invention relates generally to motor vehicles and more particularly to foldable tops therefor.

It is an object of the present invention to provide a new and improved foldable top structure for motor vehicles and one which is easily raised or lowered.

Another object of the invention is to provide for motor vehicles a new and improved foldable top which will not rattle in either its raised or lowered positions.

A further object of the invention resides in the lever and link structure of the top which provides for a smooth or steady action in the raising or lowering of the top.

Other objects of the invention will become apparent from the following detailed description taken in connection with the accompanying drawings in which:

Figure 1 is a fragmentary longitudinal sectional view of a motor vehicle body showing one side of the top structure with the parts thereof in the positions they assume when the top is in raised position;

Fig. 2 is a view of the vehicle body similar to Fig. 1 but showing the top in its lowered position;

Fig. 3 is a fragmentary cross sectional view of the body, taken along the line and in the direction of the arrows 3—3 of Fig. 1;

Fig. 4 is a sectional view of certain details of the structure, taken along the line 4—4 of Fig. 1; and Fig. 5 is a cross sectional view, taken along the line 5—5 of Fig. 4.

In the drawings only one side of the motor vehicle body and one side of the foldable top structure is illustrated, but it is to be understood that this structure is duplicated for the other side of the body and for the other side of the top structure.

Referring to the drawings by characters of reference, the motor vehicle body illustrated includes a floor 10 and at each side of the body intermediate pillars 11 and rear pillars 12 extend upwardly from the floor 10, the intermediate and rear pillars of each side of the body preferably being joined together and reenforced by longitudinal frame members 13 which are rigidly secured to the pillars intermediate their upper and lower ends. The pillars 11 and 12 as well as the front pillars (not shown) are enclosed by the usual external panels 14 and internal panels 15, as illustrated in Fig. 3.

Rigidly secured to each of the intermediate pillars 11 is a rearwardly extending bracket 16 to each of which a lever 18 is pivoted by a pin 17, the levers 18 each carrying an extension member 19 which in the raised position of the top extend upwardly respectively from the intermediate pillars 11. Also pivoted to each of the brackets 16, are rearwardly extending top frame members 20, which are connected together by a rear cross bow 21 to which the top covering, as at 22, is tacked or attached in any suitable manner. An intermediate bow 23 is carried by and pivoted to the frame members 20 to which bow the top covering 22 is also attached, and in the raised position of the top, as shown in Fig. 1, the bow 23 extends upwardly and slightly forwardly from its pivot connections with the frame members 20, the bow 23 being pivoted to the members 20 by pins 24 or by other suitable means.

Each of the pillar extension members 19 is provided with an extended portion 25 adjacent the upper end thereof, which portions are provided with sockets 26 which, in the raised position of the top, face forwardly and respectively receive end bearing portions 27 of longitudinally extending, side frame members 28. The frame members 28 are rigidly secured together at their forward ends by a cross member 29 which, in the raised position of the top, seats on and is rigidly secured to a bracket 30 which is rigidly secured to the wind-shield header member 31, the means for rigidly securing the top cross member 29 to the bracket 30 being any suitable releasable attaching means. Respectively secured to each of the top frame members 28, intermediate the ends thereof, there is a bracket 32 to which forward ends respectively of link members 33 are pivotally connected, such as by pins 34, the rearwardly disposed ends of the links 33 being pivotally connected by pins 35 respectively to the upper ends 36 of the pillar extension 19, which upper ends 36 project above the sockets 26, as shown in Fig. 1. The pillar extensions 19 carry and are connected together by a cross bow 37 which may be termed the forward bow and to which the top covering 22 is tacked or otherwise suitably attached. The top covering 22 is attached to the forward cross member 29 and, of course, is also attached to the body toward the rear thereof.

Rigidly secured to each of the pillar extensions 19 there is a rearwardly extending bracket 40 and pivoted to each of the brackets 40, such as by pins 41, there is a lever 42, these levers 42 being pivoted intermediate their ends providing, as shown in Fig. 1 or in the raised position of the top, an upwardly extending arm 43 and a lower and rearwardly extending lever arm 44.

The upper ends of the lever arms 43 are respectively and pivotally connected, such as by pins 45, to the ends 27 of the frame members 28. Pivoted respectively to each of the body frame members 13, such as by pivot pins 46, there is a lever 47, which lever is provided with a forwardly extending bent end portion 48. The latter is pivotally connected by a link 49 to the pivot pin 41 of the bracket 40, which pivot pin 41 also serves as a fulcrum for a lever 42, this structure being duplicated on opposite sides of the vehicle. Intermediate the ends of the levers 47, links 51 have their corresponding ends respectively and pivotally connected thereto by pivot pins 52, the other ends of the links 51 being pivotally connected respectively to the corresponding ends of the lever arms 44, such as by pivot pins 53. It will thus be seen that the links 51 respectively interconnect the levers 42 and 47 and that the links 49 respectively interconnect the levers 47 and the pillar extension members 19.

Pivotally connected by pins 55 respectively to and intermediate the ends of the links 51 are the upper ends of tubular members 56, the lower ends of which carry respectively internally threaded insert members or screws 57 for respectively receiving threaded rotatable shafts 58 which are rotated in one direction to raise the top and are rotated in the opposite direction to lower the top. The lower ends of the shafts 58 extend into gear housings 59 which are pivoted to brackets 60 rigidly secured to the body floor 10, the casings 59 being arranged to pivot so as to permit swinging movement of the shafts 58 necessary in the raising and lowering of the top frame structure. The shafts 58 may be driven by a suitable electric motor 61 which may be rigidly secured by a bracket 62 intermediate the casings 59 to a cross member support 63. From opposite sides of the motor 61 extend driven shafts 64 which are provided with worm gears 65 in mesh with worm wheels (not shown) in the casings 59. The shafts 64 are arranged to cant so as to maintain driving connections between the motor 61 and the gears in the housing 59 during the swinging movements of the drive shafts 58. The above described connections between the motor 61 and the gears and casing 59 are not shown in detail since they are not the subject matter of the present invention, but for a more detailed description of such connections reference may be had to my co-pending application, Serial No. 328,720, filed April 9, 1940. As shown in detail in Figs. 4 and 5, the threaded insert member 57 may be multi-sided or hexagonal to fit into a correspondingly shaped end portion 65 of the tube 56 to prevent rotation of the member 57 relative to the tube 56. It will be noted that the upper ends of the tubes 56 are pivoted at 55 to the links 51 intermediate the pivot pins 50 and 52 which respectively connect links 49 and 51 to the levers 47. Preferably each of the levers 18 which carry the extension members 19 is provided with a rearwardly extending arm 66 to which ends of helical coil springs 67 are respectively secured, the other ends of the springs 67 being anchored, as at 68, to the rear body pillars 12. These springs 67 are arranged to be placed under tension as the top is lowered which steadies the lowering motion of the top, the springs also acting to aid the motor 61 during the operation of raising the top.

Operation

The motor 61 is of the reversible type and under the control of the operator may be started to drive shafts 64 in directions to either raise or lower the top structure. In lowering the top, the shafts 64, through worm gears 65 meshed with worm wheels in the casings 59, rotate the shafts 58 in directions which cause the tubes 56 to be drawn downwardly. As the tubes 56 are drawn downwardly, links 51 are drawn downwardly therewith, swinging the lever 47 counterclockwise around their pivots 46 and also swinging the links 49 in a clockwise direction about their respective pivot pins 41. Since the links 51 are connected by the pivot pins 53 to the levers 42, the levers 42 are pivoted in a clockwise direction and at the same time levers 18 and extensions 19 carried thereby are swung in a clockwise direction about their respective pivot pins 17. When the extensions 19 swing rearwardly, the sockets 26 thereof disengage from the frame member ends 27 and the frame members 28 pivot about the pivot pins 34 in counterclockwise directions. The tubes 56 continuing in their downward movement move the pivot pins 55 in clockwise directions about the pivot pins 41 which at the same time are being swung also in clockwise directions about the pivot points 17 resulting in pivots 55 moving from the position shown in Fig. 1 to the position shown in Fig. 2. With all of the levers and links moving in the directions above described the rear bow first comes to rest in its lowered position after which the intermediate bow 23 carried thereby folds or swings down against the rear bow, and the link and lever structure carried by the extension members 19 swings about the various pivots until the parts assume the positions shown in Fig. 2 when the top is completely lowered. During the lowering operation of the top it will be seen that the drive shaft 58 and the tubes 56 swing slightly about the pivots of the gear casings 59 in a clockwise direction to permit the various link and lever movements to take place unresisted. In raising the top, the movements of the various levers and connecting links is, of course, the reverse from that of lowering of the top. When raising the top, motor 61 is operated in the reverse direction which causes the tubes 56 to be moved upwardly. When the tubes 56 move upwardly links 51 are moved upwardly which action causes levers 47 to pivot in clockwise directions about the pivots 46 and causes levers 42 to pivot in counterclockwise directions about the pivots 41. Also the upward movement of the links 51 acting through the links 49 and through the levers 42 swings the pillar extensions 19 upwardly and forwardly in counterclockwise directions, the levers 42 being carried thereby and moving to ultimately position the ends of the frame members 27 in the sockets 26 of the extensions 19 just prior to completion of the top raising action. As the various levers and links move in the raising of the top, the top covering 22 is drawn forward and, when the forward bow 37 approaches its raised position, the top covering is tightened, moving the bows 21 and 23 to the positions shown in Fig. 1 in which positions the bows 21 and 23 are held solely by the top covering 22. During the raising operation of the top the springs 67, which were previously further tensioned by the lowering action of the top, now aid to raise the top.

While I have shown and described my invention in detail it is to be understood that the same is to be limited only by the appended claims for many changes may be made without departing from the spirit and scope of the invention.

What I claim is:

1. In a foldable top structure for a vehicle body having a pair of upright pillars respectively positioned at opposite sides thereof, a pair of extension members respectively for said pillars and pivoted to swing rearwardly upon lowering of the top, a first pair of levers fulcrumed intermediate the ends thereof on said extension members, a second pair of spaced levers fulcrumed on said body, means interconnecting respectively said first pair of levers and said second pair of levers, and means respectively connecting said second pair of levers to the fulcrums of said first pair of levers on said pair of extension members.

2. In a foldable top structure for a vehicle body having a pair of upright pillars respectively positioned at opposite sides thereof, a pair of extension members respectively for said pillars and pivoted to swing rearwardly upon lowering of the top, a first pair of levers fulcrumed intermediate the ends thereof on said extension members, a second pair of spaced levers having their rearward ends fulcrumed on said body, a pair of links respectively connecting said first pair of levers to pivots intermediate the ends of said second pair of levers, and means pivotally connecting said extension members to the forward ends of said second pair of levers.

3. In a foldable top structure for a vehicle body having a pair of upright intermediate side pillars, a pair of extension members respectively for the pillars and pivoted to swing rearwardly upon lowering of the top, a first pair of levers fulcrumed intermediate the ends thereof respectively on said extension members, a second pair of spaced levers fulcrumed on the body rearwardly of the fulcrum of said first pair of levers, a first pair of links respectively connecting said extension members to a first pair of pivots on said second pair of levers, and a second pair of links respectively connecting said first pair of levers to a second pair of pivots on said second pair of levers spaced away from said first pair of pivots.

4. In a foldable top structure for a vehicle body having a pair of upright pillars respectively positioned at opposite sides thereof, a pair of extension members respectively for said pillars and pivoted to swing rearwardly upon lowering of the top, a first pair of levers fulcrumed intermediate the ends thereof on said pillar extension members, a second pair of spaced levers fulcrumed on said body, a first pair of links respectively connecting said second pair of levers to said extension members, an outrigger structure pivotally mounted on corresponding ends of said first pair of levers, a second pair of links connecting the other ends of said first pair of levers to said second pair of levers at a different distance from the fulcrums thereof than said first pair of links, and a third pair of links connecting said outrigger structure to said pillar extension members.

5. In a foldable top structure for a vehicle body having a pair of upright pillars respectively positioned at opposite sides thereof, a pair of extension members respectively for said pillars and pivoted to swing rearwardly upon lowering of the top, a first pair of levers fulcrumed intermediate the ends thereof on said pillar extension members, a second pair of spaced levers fulcrumed on said body, a first pair of links respectively connecting said second pair of levers to said extension members, an outrigger structure pivotally mounted on corresponding ends of said first pair of levers, a second pair of links connecting the other ends of said first pair of levers to said second pair of levers at a different distance from the fulcrums thereof than said first pair of links, and a third pair of links connecting said outrigger structure to said pillar extension members, said pillar extension members having sockets for releasably receiving the rearward portions of said outrigger structure.

6. In a foldable top structure for a vehicle body having a pair of upright pillars respectively positioned at opposite sides thereof, a pair of extension members respectively for said pillars, and pivoted to swing rearwardly upon lowering of the top, a first pair of levers fulcrumed intermediate the ends thereof on said pillar extension members, a second pair of spaced levers fulcrumed on said body, a first pair of links respectively connecting said second pair of levers to said extension members, an outrigger structure pivotally mounted on corresponding ends of said first pair of levers, a second pair of links connecting the other ends of said first pair of levers to said second pair of levers at a different distance from the fulcrums thereof than said first pair of links, and a third pair of links connecting said outrigger structure to said pillar extension members, the adjacent ends of said first and second pair of levers being bent approximately parallel to each other in one position of said top structure.

7. In a foldable top structure for a vehicle body having a pair of upright pillars respectively positioned at opposite sides thereof, a pair of extension members respectively for said pillars and pivoted to swing rearwardly upon lowering of the top, a first pair of levers fulcrumed intermediate the ends thereof on said pillar extension members, a second pair of spaced levers fulcrumed on said body, a first pair of links respectively connecting said second pair of levers to said extension members, an outrigger structure pivotally mounted on corresponding ends of said first pair of levers, a second pair of links connecting the other ends of said first pair of levers to said second pair of levers at a different distance from the fulcrums thereof than said first pair of links, and a third pair of links connecting said outrigger structure to said pillar extension members, the adjacent ends of said first and second pair of levers being bent approximately parallel to each other in one position of said top structure, and said first and second pair of links being disposed approximately parallel to each other whereby said bent ends of said levers and said links approximately define parallelograms.

FREDERICK J. WESTROPE.